May 15, 1962 W. P. O'MALLEY 3,034,895
CONTINUOUS INFUSION SPARGING
Filed June 2, 1960 2 Sheets-Sheet 1
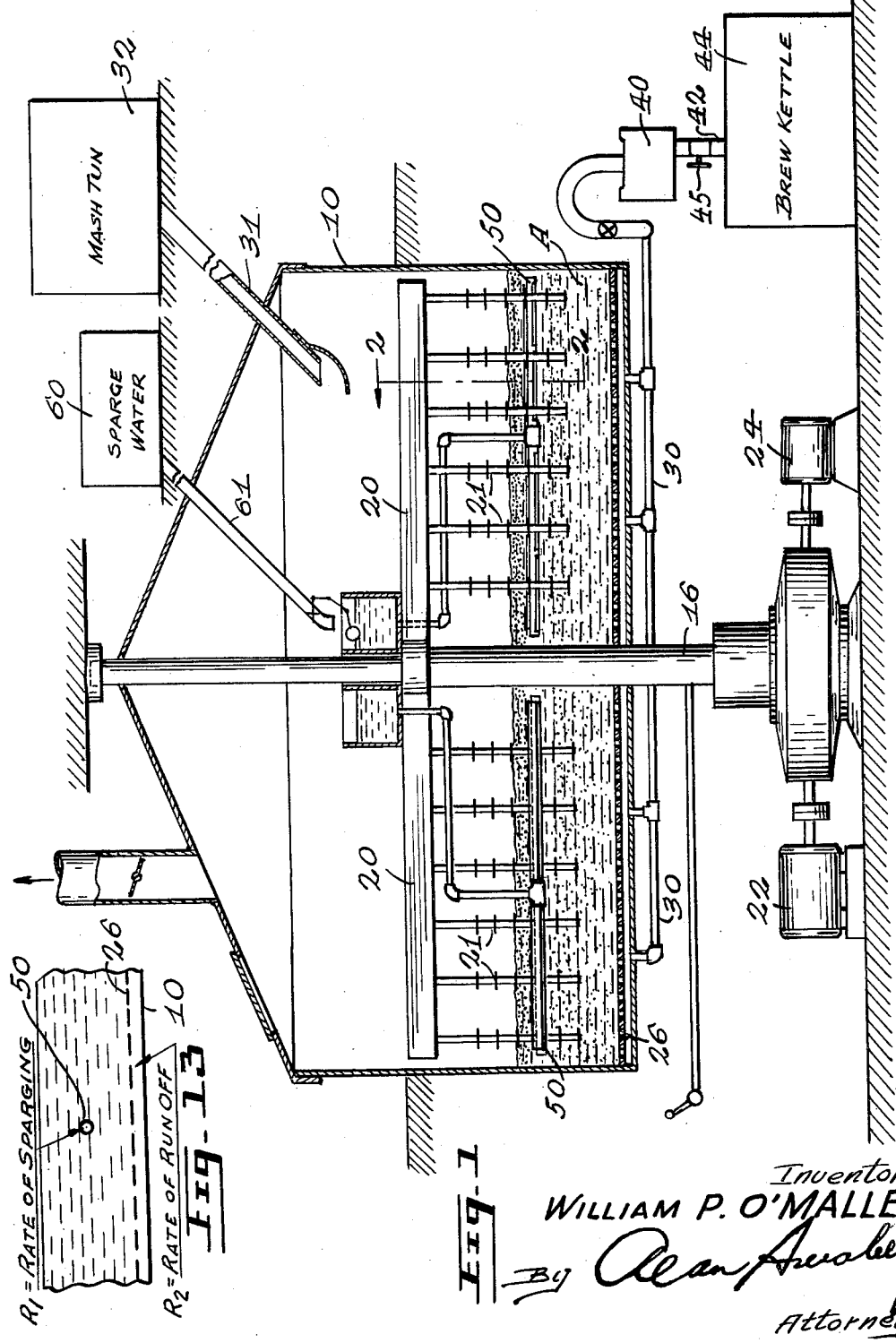
Inventor
WILLIAM P. O'MALLEY
By Alan Arvoley
Attorney

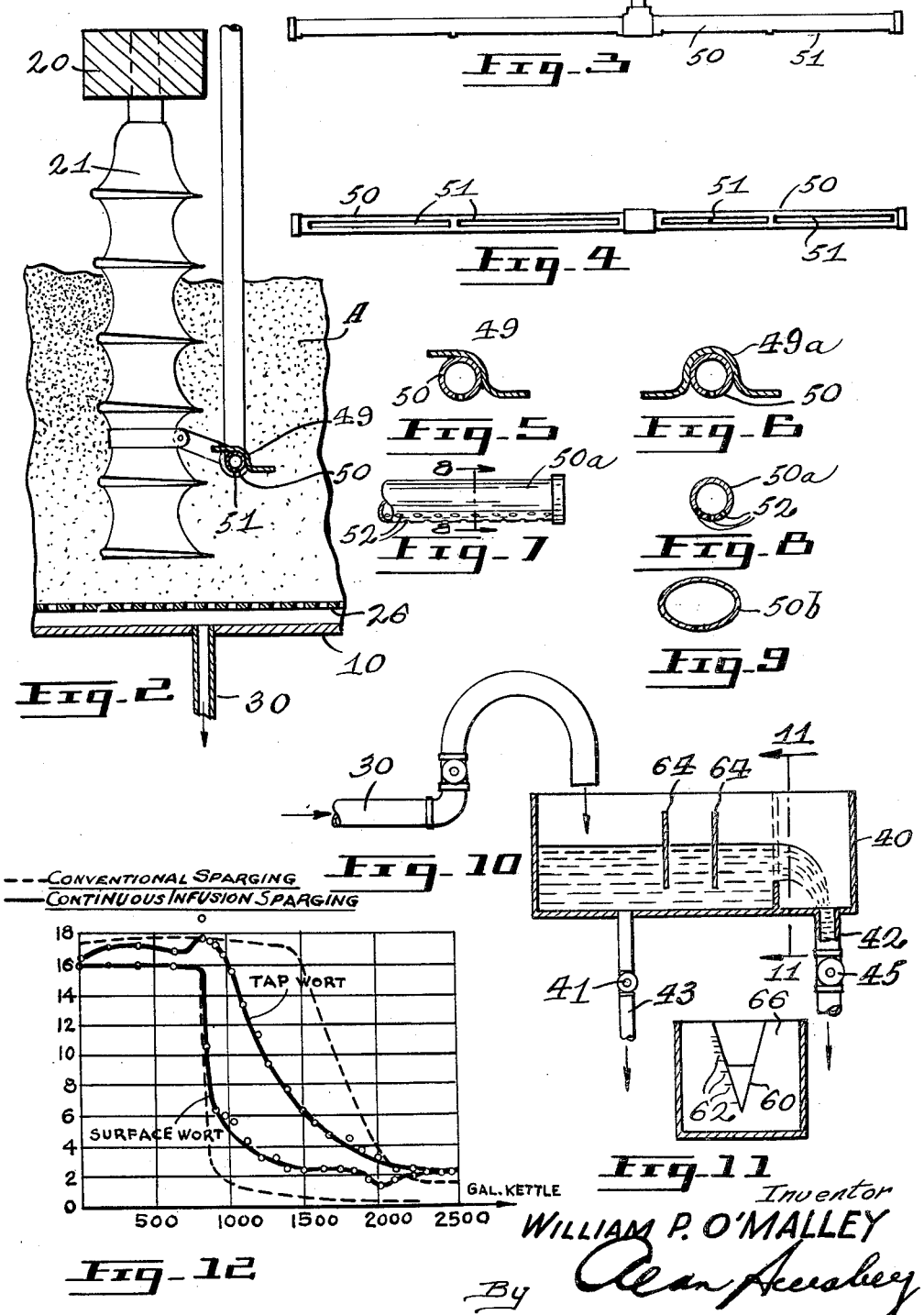

3,034,895
CONTINUOUS INFUSION SPARGING
William P. O'Malley, 5581 Darlington Ave.,
Montreal, Quebec, Canada
Filed June 2, 1960, Ser. No. 33,513
11 Claims. (Cl. 99—51)

The present invention relates to the brewing of beer and more particularly to an improved method and an apparatus adapted to carry out the method of drawing off the wort during the lautering operation.

The extraction of wort from the grains mash during the lautering operation is an important step in the production of beer. When the greater portion of the first wort has been filtered off, the remaining absorbed and occluded wort is washed out of the spent grains by sparging the latter with water. In conventional sparging, 100 percent of the sparge water passes through the surface of the grains bed and through the immediate upper strata. When the sparge water strikes the surface of the filter bed, the concentration of wort in the sparge water is zero, and consequently the sparge water is at its maximum extractive power. The occluded and absorbed wort in the upper layers of the mash bed is soon washed clean of the spent grains. This occurs after approximately 30 percent of the sparge water has passed through the bed. The sparge water passes through these upper layers of low wort concentration when it is at its maximum extractive power because the sparge water is at zero concentration at this time. Now with little or no wort to extract, the sparge water thus extracts the undesirable from the husks, and severely leaches the upper portion of the mash bed. This leaching of the upper strata is not noticed until the last taps when the wort concentration of the whole bed falls to a lower level, usually between 0.8 to 1.2° Bé.

It is known that oxidation of the wort has a deleterious effect on the palate of the final beer. In conventional sparging, the sparge water, as mentioned above, is dispersed in a fine spray over the entire surface of the mash. This fine spray of sparge water is ideally suited for dissolving a maximum amount of oxygen from the atmosphere through which it is passed before reaching the filter bed. This dissolved oxygen is carried by the sparge water directly into the grains bed where it oxidizes the tannin of the husks and other constituents of the wort.

The present method of extracting wort from the spent grains during the lautering operation eliminates these undesirable reactions, by injecting the sparge water directly into the spent grains at various levels beneath the surface of the grains bed, which in effect results in sparging the spent grains with dilute wort.

A main object of the present method is to produce a finer, more palatable beer by eliminating objectionable harshness and bitterness and by imparting to the beer a more pleasant delicate bitterness and mellowness which is generally associated with beers that have been matured for a considerable period of time. This is achieved, by reason of the present method, by reducing to a minimum the undesirable flavours imparted to the beer by the tannin and bitter principles of the husks which would normally be dissolved from the latter. In addition, the beer thus produced has an increased shelf life, and greater resistance to the formation of chill haze.

A further feature inherent in the present method is to increase the efficiency of the lautering operation resulting in a higher yield, a shorter run-off period and a better control over the run-off.

Continuous infusion sparging according to the method of the present invention is based on the physical principles as follows:

(1) That more gentle extraction will result when the concentration differential between the sparge water and the occluded and absorbed wort is at a minimum.

(2) That loosening of the grains bed in horizontal planes is conducive to easier passage of the sparged wort as opposed to the compression of the grains bed in a vertical direction which would have the opposite effect.

(3) That "working-in" the sparge water by mechanical manipulation of the spent grains increases the penetrating action of the sparge water and results in a more thorough extraction of the absorbed occluded wort.

In accordance with the invention the method of the invention is carried out by means of the following apparatus. The sparge water is injected directly into the grains bed, below the surface of the grains bed, for example by one or more horizontal slotted or perforated pipes preferably fixed to the lauter tun blades. These spargers are set slightly above the usual false bottom of the lauter tun when at their lowest position and cover the full diameter of the lauter tun. Preferably, the slots in the sparger, or slotted pipes, progress from about one-eighth of an inch in width at the center of the tun to about three-eights of an inch at the outside, and are preferably directed towards the false bottom. In one preferred construction a slicer plate is used to clear a path for the sparge arm carrying the water distributing spargers as they travel submerged through the grains bed.

For the water supply, in a preferred construction, an open reservoir feeds the sparger at a uniform pressure of approximately two pounds per square inch, and prevents excessive line pressure on surges of pressure from being transmitted to the grains bed to avoid any vertical compression.

Having thus generally described the nature of the invention, particular reference will be made to the accompanying drawings wherein is shown by way of illustration a preferred embodiment thereof, and in which:

FIGURE 1 is a partially diagrammatic view of a typical lauter tun embodying sparging blades according to the present invention.

FIGURE 2 is an enlarged detail view of a typical lauter tun agitating blade with a sparging arm attached.

FIGURE 3 is a view in side elevation of the sparger arm construction shown in FIGURE 2.

FIGURE 4 is a bottom plan view of the sparger arm construction shown in FIGURE 3 to illustrate one preferred arrangement of water discharge slots.

FIGURE 5 is a trans-axial cross-sectional view of an alternative sparger arm construction including one form of slicer plate.

FIGURE 6 is a trans-axial cross-sectional view of an alternative sparger arm construction including a further form of splicer plate.

FIGURE 7 is a detailed view of one end of an alternative sparger arm construction embodying a plurality of circular openings for water distribution.

FIGURE 8 is a trans-axial cross-sectional view along the line 8—8 of the form of sparger arm shown in FIGURE 7.

FIGURE 9 is a trans-axial cross-sectional view of an ovaloid form of sparger arm designed to combine the function of slicer plates with the water distributing tube.

FIGURE 10 is an enlarged diagrammatic view partially in section of a flow regulator arrangement as shown diagrammatically in FIGURE 1 preceding the delivery of the wort to the brew kettle.

FIGURE 11 is a cross-sectional view of the construction shown in FIGURE 10 along the line 11—11 to illustrate the V-shaped flow gauging orifice.

FIGURE 12 is a graph illustrating for comparison the results achieved by conventional sparging and continuous infusion sparging in terms of Gravity of Surface Wort and Tap Wort vs. Gallons in Kettle.

FIGURE 13 is a diagrammatic sketch showing the cross-section of the sparger submerged in the grains bed for comparison of rate of sparging and run off.

With particular reference to FIGURE 1, showing a preferred arrangement 10 indicates a lauter tun wherein the mash A is subjected to the lautering action to remove the wort. The construction shown is generally conventional having a central shafting arrangement 16 extending axially through the lauter tun 10, with a double armed rake or mash agitator 20, mounted on the shafting 16 for rotation by drive motors 22, 24. The rake 10 is mounted for controlled vertical movement (usually hydraulically) through the mash as it rotates and each arm is provided with a plurality of lauter tun blades 21.

To permit withdrawal of wort from the mash, the tun 10 is provided with a perforated false bottom 26 with conduit means 30 connected into the bottom of the tun 10, and leading to a grant or flow control tank 40. A usual indication of the characteristics of the wort flowing from the grant or control tank 40 to the brew kettle is provided by the arrangement shown in FIGURES 10 and 11. As diagrammatically illustrated the wort flows through the tank 40 and over a weir 66 provided with a V-shaped slot 60. Graduations 62 along the side of the slot 60 give a visual indication as to the consistency of the wort in a predetermined volume flow so that as the sparging operation proceeds a control is provided of the consistency of the wort being delivered to the kettle. An acquiescent flow is maintained by baffles 64 and when the wort falls below a predetermined consistency the valve 45 on the conduit 42 is closed and the valve 41 on the conduit 43 is opened diverting the flow to the brew kettle 44. This arrangement is conventional with lautering tuns and is well known in the art.

In the arrangement shown, the mash A is delivered to the tun 10 by a chute or conduit 31, from a mash tun 32. It will be appreciated that the present method could be applied to a combined mash and lauter tun as is also well known in the art.

In accordance with the present invention, the sparge water is injected directly into the mash or grains bed A by means of a pair of horizontal pipes or spargers 50 having water distributing slots 51. The spargers 50 are secured to the lauter tun blade 21. With reference to FIGURE 2 for example, the spargers 50 are preferably set at a distance of about 4½ inches from the false bottom 26 when at the lowest position and extends to cover the full diameter of the lauter tun.

The slots 51 and the spargers 50 are preferably made so as to taper from a width of about ⅛ of an inch at the inner end located adjacent to the center of the tun to about ⅜ of an inch at the outer end to ensure even distribution of the sparge water throughout the entire volume of spent grains. The slots 51 are directed towards the false bottom 26 in the preferred construction shown, see FIGURES 1 to 4. As will be appreciated, and as shown in FIGURES 5 to 9 the shape of the spargers 50 may be varied in contour with the size and the shape of the perforations 51 varied without departing from the scope of the invention. For example, as shown in FIGURES 7 and 8, the sparger arm 50A is provided with a plurality of circular perforations 52 in the place of the elongated slots 51. In the construction shown in FIGURES 1, 2 and 6 slicer plates 49 are used to clear a path for the sparger arms 50 as they travel submerged through the grains bed A. As is shown in FIGURE 6, the shape of the slicer plate can also be varied as indicated at 49A, and as shown in FIGURE 9, the sparger tubes 50 can be varied in shape, for example, to varying ovaloid forms indicated at 50B to aid in the passage through the grains bed with or without slicer plates.

In the preferred construction shown, the sparger arms 50 are fed from an open top reservoir 60 by means of conduit 61, at a uniform pressure of approximately 2 pounds per square inch. This arrangement prevents excessive line pressures or surges of water pressure from being transmitted to the grains bed A.

In an experimental arrangement, the spargers 50 consisted of a ¾ inch brass pipe which was fed from a 1½ inch line from an open reservoir disposed inside the lauter tun. The reservoir was supported by the lauter tun blade arm 20 and was situated approximately 4 feet above the sparger arm 50.

In operation, the apparatus described in carrying out the method of the invention follows the following sequence: as the sparging begins, the blades 21 are rotated and the submerged spargers 50 cut the grains bed A in a horizontal plane, spreading a sheet of sparge water at that level, and loosening the bed for easier flow, and "working-in" the water into the spent grains. As the sparging progresses, the sparger arms are lowered to new levels, passing from about 10 inches at the beginning of the sparging cycle, to about 4½ inches from the false bottom 26 towards the end of the sparging cycle and this for a grains bed of approximately 12 inches. The rate of sparging determines the amount of sparge water that will reach the surface of the grains bed for a given run-off rate. Thus, the greater the sparge rate above this run-off rate, the greater will be the amount of sparge water reaching the surface of the filter bed.

FIGURE 13 is a diagrammatic sketch showing a cross-section of the sparger submerged in the grains bed, with the sparge water being fed at the rate of $R_1$, and with the run-off rate equal to $R_2$.

When $R_1$, the sparging rate is greater than $R_2$, the run-off rate, the sparge water rises to the surface of the grains bed A. Thus, by varying the rate of sparge $R_1$, a controlled amount of sparge water (now dilute wort) can be made to rise on the surface of the grains bed.

It will be appreciated that the apparatus shown to illustrate the method of the invention is one way only of feeding the sparge water into the grains bed. It is contemplated that other forms of apparatus could be used for this purpose, for example a spray or nozzle arrangement could be mounted for reciprocal travel along the lauter blade arms as they travel through the mash. As a further alternative a sparger could be utilized which would rotate about its own axis so as to sparge and loosen the grains bed while being carried through the grains bed by the lauter blade arms.

In a continuous mashing and lautering process, the grains bed is carried forward to the next processing stage on a slotted or false bottom. In this case the sparger arms would be fixed and the grains bed made to flow past the sparger as opposed to the spargers travelling through the grains bed. The main requirement in any case is that the sparge water be fed to the grains bed beneath the surface of the grains bed and preferably in progressive layers to accomplish the method of the present invention.

As previously discussed, continuous infusion sparging, in accordance with the present method, reduces to a minimum the objectionable effects of the sparging operation by injecting the sparge water beneath the surface and directly into the mash bed and results in the following:

(1) The sparge water is continuously injected at a point of highest wort concentration.

(2) There is an immediate increase of wort concentration in the sparge water so that a minimum concentration differential exists between the sparge water, now enriched with wort, and the wort itself. In effect, sparging is carried out with dilute wort of a concentration only slightly lower than that of the occluded and adsorbed wort in the spent grains. This condition exists throughout the depth of the grains bed so that no leaching is possible.

(3) The entire sparging cycle is carried out at an average higher level of wort concentration since a smaller quantity of sparge water is used. This is possible because the sparge water is used more efficiently in continuous infusion sparging as a result of "working-in" the sparge water into the spent grains while loosening the grains bed in horizontal planes. This gentle loosening of the grains bed results in better drainage of the sparge wort from the spent grains.

(4) There is little or no oxidation of the wort or constituents of the grains bed during the sparging operation since there is no oxygen pick up by the sparge water as the latter is filled directly from the reservoir to points beneath the surface of the grains bed.

With reference to FIGURE 12, the graphs shown in broken lines refer to conventional sparging and illustrate the gravity drop of the wort on the surface of the filter bed (surface wort) and the corresponding gravity drop of the wort at the taps (tap wort) during the lautering operation.

Sparging began when 750 gallons of wort had been run into the kettle, and the kettle was filled to 2,450 gallons.

When 1,000 gallons of wort had been run into the kettle, the surface wort gravity was 1.8° Bé. and the corresponding gravity of the tap wort was 17.5° Bé. With 1,500 gallons in the kettle, the surface wort gravity dropped to 0.3, while the tap wort gravity was 16.2° Bé.

By comparing the two curves of FIGURE 12, referring to the conventional sparging, it will be seen that the gravity of the surface wort drops very rapidly from the beginning of sparging to (750 gallons in kettle) below 1.0° Bé.; when the kettle is half full (1,225 gallons), decreasing to 0.2° Bé., and then to 0.1° Bé. toward the latter part of the run-off. Meanwhile, the tap wort gravity remains high for most of the run-off, decreasing to 3.8° Bé., with 2,000 gallons in the kettle (80% of kettle full) and ending with a final tap gravity of 1.3° Bé. at kettle full. The result is a large gravity differential between the surface wort and the tap wort, which can be measured by the distance separating the two curves.

Again referring to FIGURE 12, the solid line refers to continuous infusion sparging according to the invention and illustrates the gravity drop of the surface wort and of the tap wort as previously described for conventional sparging.

Here where sparging begins, the surface wort gravity drops rapidly but not as drastically as in conventional sparging, remaining well above 2.0° Bé., for most of the run-off period, and ending at 2.0° Bé.

Meanwhile, the tap gravity has dropped more rapidly than in conventional sparging, bringing the two curves closer together, showing that a smaller gravity differential exists between the surface wort and the tap wort.

It will be noted that the values of the slopes of the curves referring to the continuous infusion sparging are closer than those representing the conventional sparging, illustrating a more homogeneous extraction of the sparging grains. The final tap gravity is 2.3° Bé.

It will be seen that by "working-in" the sparge water directly into the grains bed, the efficiency of the over-all lautering operation is increased. Greater flexibility in the run-off is possible, resulting in a shorter run-off period for a given amount of sparge water. It should be emphasized that the spargings run bright, and no clouding occurs at any time during the complete sparging operation.

In one experiment, the sparger was lowered to within two inches of false bottom 26. With the sparge arm operating at this level, the tap wort was exceptionally clear, but the run-off rate was reduced slightly. It was found that entirely satisfactory results were obtained when the sparger's lowest position was set at 4½ inches from the false bottom, as previously mentioned.

By way of an example, the following table lists some noteworthy results obtained with continuous infusion sparging.

|  | C.I.S.[1] | C.S.[2] |
| --- | --- | --- |
| Last Runnings, ° Bé | 2.3-2.6 | 0.9-1.2 |
| Last Runnings[3], pH | 5.5 | 5.7 |
| First Wort, pH | 5.4 | 5.4 |
| Sparge Water, Gals | 1,400 | 1,800 |
| Run-off Time, Hrs | 2½ | 2½ |
| Run-off Time, Hrs. (using 1,800 gals. sparge water) | 2½ | |

[1] Continuous infusion sparging.
[2] Conventional sparging.
[3] Sparge water not treated.

It will be seen that the gravity of the last runnings is from 2.3° Bé. to 2.6° Bé. with infusion sparging as compared to 0.9° Bé. to 1.2° Bé. with conventional sparging.

The increase in pH of the last runnings over that of the first wort is at most 0.1 using infusion sparging, compared to an increase of 0.3 using conventional sparging. It should be noted that no water treatment was used in the sparge water, and that this sparge water contained 12 to 15 p.p.m. total hardness.

The same run-off time is obtained using 400 gallons less sparge water with infusion sparging than with the conventional sparging. By increasing the amount of sparge water to that used in conventional sparging, the run-off time can be reduced by 15 to 20 percent with continuous infusion sparging.

The maximum temperature utilized for the sparge water was about 59 degrees Reaumur. The total thickness of the grains bed was about 12½ inches at the end of the run-off period.

I claim:

1. A method of continuous infusion sparging comprising in addition to the usual steps of agitating the grains bed during the drawing off of the wort, the additional step of injecting the sparge water directly into the spent grains at various levels beneath the surface of the grains bed.

2. A method of continuous infusion sparging as claimed in claim 1 wherein said wort is drawn off on the bottom of said grains bed.

3. A method of continuous sparging as claimed in claim 1, wherein said sparging water is injected at progressively descending horizontal levels throughout the major portion of said grains bed simultaneously and in conjunction with said step of agitating.

4. In the method of preparing wort for fermentation with yeast and prior to the collecting of the separated wort for use in fermentation, the steps of drawing off the wort from a receptacle containing a brewing mash and the extract thereof which includes, in addition to the normal steps of agitating the mash, the step of introducing the sparging water into and beneath the surface of said mash in progressive horizontal layers simultaneously and in conjunction with said agitating steps.

5. In the method of preparing wort for fermentation with yeast and prior to the collecting of separated wort for use in fermentation, the steps of drawing the total wort from the bottom of the vessel containing a brewing mash and extract from the mash while continuously agitating said mash and simultaneously introducing sparging water below the surface of said mash and in successive horizontal layers throughout the major portion of the depth of said mash.

6. In the method of preparing wort for use in fermentation the steps of drawing off the wort from a vessel containing a brewing mash and the extract thereof, which includes the steps of agitating the mash in progressively descending layers while introducing sparging water underneath the surface of said mash and in progressively descending horizontal layers simultaneously and in conjunction with said agitating step.

7. In a brewing apparatus for producing and drawing off the wort from a mash, and in addition to a vessel for the mash having a perforated false bottom, conduit connected to the bottom of said vessel for drawing off the wort and a means for agitating the mash; a means for introducing sparging water into and beneath the surface of said mash in progressive horizontal layers throughout the major portion of the depth of said mash, during the drawing off of said wort.

8. In brewing apparatus for producing and drawing off wort from a mash, and in combination with a vessel for the mash having a perforated false bottom, conduit means connected to the bottom of said vessel beneath said perforated false bottom for the drawing off of the wort, a source of water under pressure and an agitating device mounted within said vessel for progressively descending rotation therein; water injection means connected to said agitating device, and conduit means between said source of water supply and said water injection means, whereby water is fed into said mash beneath the surface thereof in progressive horizontal layers in the path of said agitating device.

9. A sparging apparatus for use in combination with a vessel for mash having a perforated bottom and means for agitating the mash within said vessel; comprising at least one elongated water distributing member provided with water discharge outlets mounted within said vessel in spaced relationship from said perforated bottom and in a location beneath the normal upper level of said mash, a source of water under pressure, and conduit means between said source of water and said water distributing member.

10. A sparging apparatus as claimed in claim 9 wherein said water distributing member extends radially of said mash containing vessel and is mounted for progressively descending rotation within said vessel in the path of said means for agitating said mash.

11. A sparging apparatus as claimed in claim 10 wherein said means for agitating said mash comprises a radial arm mounted for rotation within said vessel and said water distributing member is mounted on said radial arm.

References Cited in the file of this patent

UNITED STATES PATENTS 2,014,945   Mayer _____ Sept. 17, 1935